(12) United States Patent
Neely et al.

(10) Patent No.: US 10,575,462 B2
(45) Date of Patent: Mar. 3, 2020

(54) SICKLE BAR DRIVE MOUNT

(71) Applicant: Deere and Company, Moline, IL (US)

(72) Inventors: Jesse R. Neely, Annawan, IL (US); Lucas Laudenbach, Davenport, IA (US)

(73) Assignee: Deere & Company, Moline, IL (US)

( * ) Notice: Subject to any disclaimer, the term of this patent is extended or adjusted under 35 U.S.C. 154(b) by 171 days.

(21) Appl. No.: 15/294,203

(22) Filed: Oct. 14, 2016

(65) Prior Publication Data

US 2018/0103580 A1    Apr. 19, 2018

(51) Int. Cl.
*A01D 34/00*      (2006.01)
*A01D 34/14*      (2006.01)
*A01D 34/33*      (2006.01)
*A01D 34/04*      (2006.01)
*A01D 34/28*      (2006.01)
*A01D 101/00*     (2006.01)

(52) U.S. Cl.
CPC .......... *A01D 34/145* (2013.01); *A01D 34/04* (2013.01); *A01D 34/283* (2013.01); *A01D 34/33* (2013.01); *A01D 2101/00* (2013.01)

(58) Field of Classification Search
CPC .... A01D 34/145; A01D 34/04; A01D 34/283; A01D 2101/00
USPC ........ 56/17.1, 287, 279, 280, 282, 284, 296, 56/303, 304, 309, 311
See application file for complete search history.

(56) References Cited

U.S. PATENT DOCUMENTS

| | | | |
|---|---|---|---|
| 2,297,317 A * | 9/1942 | Paradise | A01D 34/30 56/158 |
| 2,742,753 A * | 4/1956 | Hardman | A01D 34/30 403/344 |
| 3,148,492 A * | 9/1964 | Naor | A01D 34/305 56/264 |
| 3,896,610 A * | 7/1975 | Hiniker | A01D 34/30 56/15.8 |
| 4,023,333 A * | 5/1977 | Anderson | A01D 34/30 56/208 |
| 4,038,810 A * | 8/1977 | Williams | A01D 57/02 56/220 |
| 6,305,154 B1 * | 10/2001 | Yang | A01D 34/13 56/296 |
| 7,743,592 B2 * | 6/2010 | Schumacher | A01D 34/33 384/495 |
| 7,937,920 B2 | 5/2011 | Schmidt et al. | |
| 8,151,547 B2 * | 4/2012 | Bich | A01D 34/30 56/158 |

(Continued)

FOREIGN PATENT DOCUMENTS

EP        2218319      8/2010

OTHER PUBLICATIONS

European Search Report for EP 17196328.3 dated Mar. 15, 2018.

*Primary Examiner* — Thomas B Will
*Assistant Examiner* — Mai T Nguyen
(74) *Attorney, Agent, or Firm* — Rathe Lindenbaum LLP

(57) ABSTRACT

A sickle bar drive mount may include an arm and a sickle bar drive eye. The arm is mountable to a horizontally extending sickle bar. The sickle bar drive eye is to receive a sickle bar drive bearing of a sickle bar drive. The arm may extend along a first horizontal axis parallel to the sickle bar. The sickle bar drive eye is pivotally coupled to the arm for pivotal movement about a second horizontal axis perpendicular to the first axis.

20 Claims, 8 Drawing Sheets

(56) References Cited

U.S. PATENT DOCUMENTS

| | | | |
|---|---|---|---|
| 8,282,287 B2 * | 10/2012 | Martinez | A01D 34/33 |
| | | | 384/495 |
| 8,555,607 B2 * | 10/2013 | Coers | A01D 41/14 |
| | | | 56/158 |
| 2008/0072560 A1 * | 3/2008 | Talbot | A01D 41/14 |
| | | | 56/208 |
| 2011/0113741 A1 | 5/2011 | Coers | |
| 2014/0150395 A1 | 6/2014 | Coers et al. | |
| 2014/0215995 A1 | 8/2014 | Cook et al. | |
| 2014/0230398 A1 | 8/2014 | Cook et al. | |
| 2015/0000237 A1 * | 1/2015 | Ritter | A01D 34/145 |
| | | | 56/10.1 |

* cited by examiner

SICKLE BAR DRIVE MOUNT

BACKGROUND

Sickles (sometimes referred to as knives) are utilized in agricultural implements, wherein the sickles are linearly reciprocated to cut and sever crops from the underlying growing medium. Examples of agriculture implements which employ sickles include, but are not limited to, harvester cutting platforms and haybines. Some agricultural implements, such as harvester cutting platforms, utilize flexible sickles that locally flex along their length to adjust to changes in the underlying terrain.

DETAILED DESCRIPTION OF EXAMPLES

Figure 1:
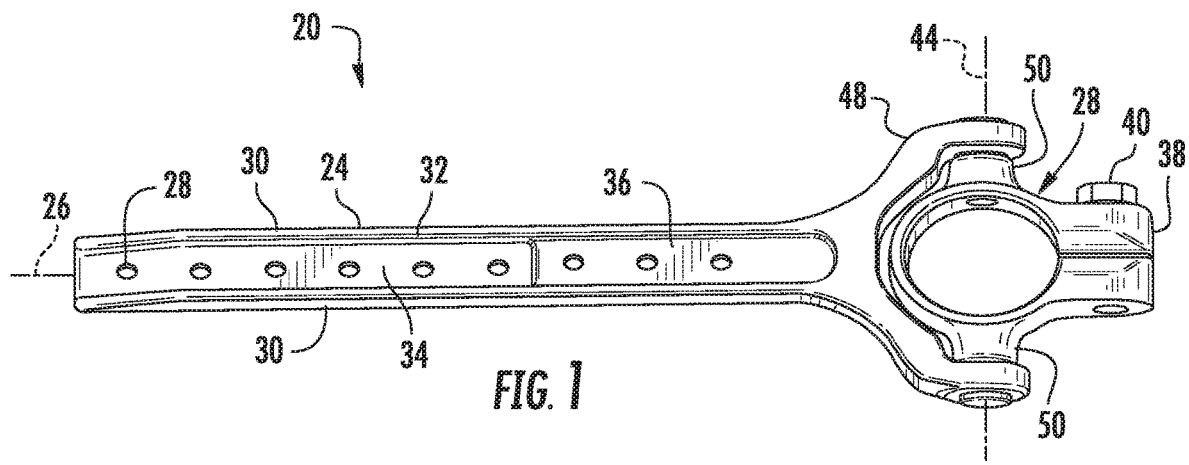
FIG. 1 is a top view of an example sickle bar drive mount.

Sickles or knives may include an elongated sickle bar or knife backing that supports a plurality of knife sections mounted to the sickle bar along its length. The sickle bar includes or is mounted to a sickle bar drive mount. The sickle bar drive mount operably couples the sickle bar to a sickle drive that linearly reciprocates the sickle. In agriculture implements where the sickle bar is flexible and locally flexes to accommodate changes in underlying terrain, the connection between the sickle bar drive and the sickle bar drive mount are stressed, leading to slippage and wear.

Disclosed herein are examples of sickle bar drive mount that accommodate the flexing, bending and undulation of the sickle bar, reducing stress on the connection between the sickle bar drive and the sickle bar drive mount. As a result, the connection between the sickle bar drive and the sickle bar drive mount is less susceptible to wear and potential damage. Disclosed herein are examples of a cutter assembly and a flexible cutting platform that employ the example sickle bar drive mount.

According to one example, a sickle bar drive mount may include an arm and a sickle bar drive eye. The arm is mountable to a horizontally extending sickle bar. The sickle bar drive eye is to receive a sickle bar drive bearing of a sickle bar drive. The arm may extend along a first horizontal axis parallel to the sickle bar. The sickle bar drive eye is pivotally coupled to the arm for pivotal movement about a second horizontal axis perpendicular to the first axis.

According to another example, a cutter assembly may comprise a flexible sickle bar extending in a horizontal plane, knife sections mounted to and along the sickle bar and a sickle bar drive mount. The sickle bar drive mount is coupled to the sickle bar. The sickle bar drive mount may comprise an arm extending along a first horizontal axis parallel and mounted to the sickle bar and a sickle bar drive eye to be connected to a sickle bar drive. The sickle bar drive eye is pivotally coupled to the arm for pivotal movement about a second horizontal axis perpendicular to the first axis.

According to another example, a flexible cutting platform for a harvester may comprise a frame, a platform floor supported by the frame, a flexible cutter bar supporting a plurality of knife guards and a plurality of ground engaging members that float along the ground terrain. The plurality of ground engaging members are coupled to the flexible cutter bar to vertically flex localized portions of the cutter bar in response to changes in ground terrain. The flexible cutting platform may further comprise a sickle drive, a sickle and a sickle bar drive mount. The sickle may comprise a flexible sickle bar supporting a plurality of knife sections passable through the knife guards such that reciprocation of the sickle by the sickle drive is guided by the knife guards. The sickle bar drive mount is coupled to the sickle bar. The sickle bar drive mount may comprise an arm coupled to the sickle bar and a sickle bar drive by. The arm extends along a first horizontal axis parallel to the sickle bar. The sickle bar drive eye receives a sickle bar drive bearing of the sickle bar drive. The sickle bar drive eye is pivotally coupled to the arm for pivotal movement about a second horizontal axis perpendicular to the first axis.

Throughout this disclosure, various terms such as sickle, sickle bar and cutter bar are used. Such terms may have different and conflicting meanings in the field. For purposes of this disclosure, the term "sickle" or "knife" refers to a sickle bar and the knife sections carried by the sickle bar, wherein the sickle is reciprocated to carry out cutting. The term "sickle bar", sometimes referred to as a "knife backing", shall mean the elongate structure of the sickle that supports the multiple knife sections along its length. The term "cutter bar", sometimes referred to as a "green bar", shall mean the elongate bar that may support knife guards and hold downs that guide reciprocating movement of the sickle.

FIG. 1 illustrates an example sickle bar drive mount 20 for operably coupling a sickle bar of a sickle to a sickle drive. Sickle bar drive mount 20 accommodates vertical flexing and undulation of the sickle bar to reduce stress upon the connection between the sickle bar drive mount and the bearing or other structure of the sickle bar drive. Sickle bar drive mount 20 comprises arm 24 and sickle bar drive eye 28.

Arm 24 comprises elongate structure which is mountable to a sickle bar. Arm 24 has a length extending along an axis 26 that is parallel to the sickle bar to which arm 24 is mounted. In the example illustrated, arm 24 comprises a series of mounting apertures 28 spaced along axis 26 for the reception of fasteners that secure mounting of arm 24 to the cutter bar. In the example illustrated, arm 24 further comprises a pair of opposite side walls 30 defining intermediate channel 32.

Sidewalls 30 extend along arm 24 to strengthen and rigidify arm 30. Channel 32 extends between walls 30. In the example illustrated, channel 32 comprises a first more deeply recessed portion 34 and a second lesser recessed portion 36. The more deeply recessed portion 34 has a depth to accommodate the thickness of an extension bar that is mounted to arm 24 and that further extends along the sickle bar. Both of recessed portions 34 and 36 have depths (after the insertion of the extension bar in recessed portion 34) that accommodate or substantially receive the height of the heads of the fasteners which secure arm 24 to the sickle bar and possibly to intermediate knife sections.

Sickle bar drive eye 28 comprises a circular or annular ring which receives a cylindrical shaft or bearing of a sickle drive. In the example illustrated, sickle bar drive eye 28 comprises a clamped joint having two opposite ends 38 secured by a fastener 40. In some implementations, sickle bar drive eye may additionally comprise an inner spherical plastic bushing (not shown). In other implementations, sickle bar drive eye 28 may comprise a continuous annular ring or may have other configurations depending upon the configuration of the bearing of the sickle drive to which mount 20 connects.

As further shown by FIG. 1, sickle bar drive eye 28 is pivotally coupled to arm 24 for pivotal movement about a second horizontal axis 44 which is perpendicular to the first axis 26. In the example illustrated, Axis 44 and axis 26 extend in a single plane. In other implementations, axis 44 and axis 26 may extend in parallel planes. Because arm 24 is pivotable about axis 44, perpendicular to arm 24 and perpendicular to axis 26, arm 24 may pivot to accommodate the vertical flexing and undulation of the sickle bar, stress upon the connection between eye 28 and the shaft or bearing of the sickle drive is reduced. The secure fit and connection between eye 28 and the shaft or bearing of the sickle drive may be maintained while arm 24 pivots with the flexing or undulation of the sickle bar.

In the example illustrated, the pivotal connection between arm 24 and eye 28 is provided by a trunnion 48 extending from arm 24 which is pinned to a pair of opposite ears 50 extending from eye 28. In other implementations, the pivotal connection may be provided by other structures. For example, in other implementations, the pivotal connection may be provided by a universal bearing or universal joint that facilitates pivoting of arm 24 relative to eye 28 about axis 44.

Figure 2:
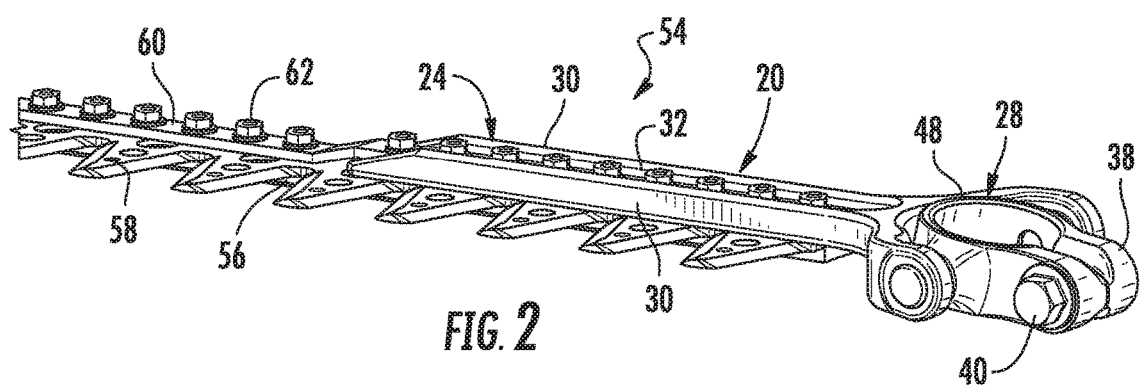
FIG. 2 is a perspective view of an example sickle including the example sickle bar drive mount of FIG. 1.
Figure 3:
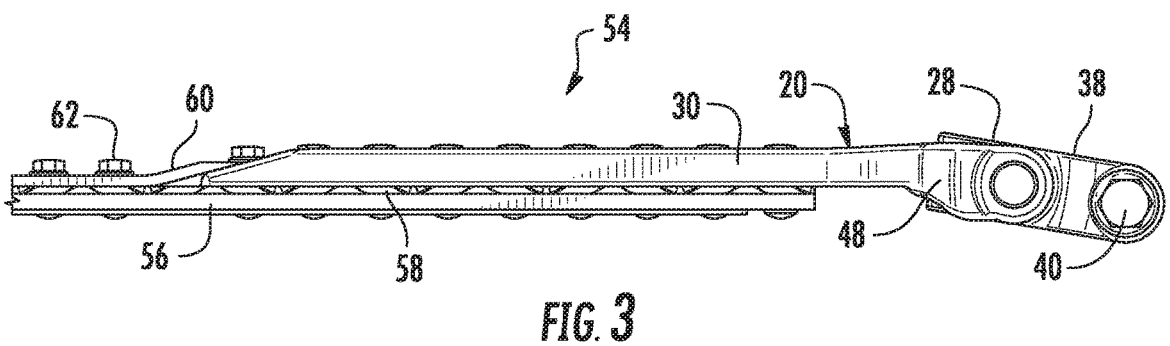
FIG. 3 is a side view of the example sickle of FIG. 2.

FIGS. 2 and 3 illustrate sickle bar drive mount 20 utilized as part of a knife or sickle 54. As indicated above, sickle 54 may be employed in a harvester flexible cutting platform. Sickle 54 may also be employed and other agricultural implements where the sickle may undergo appreciable vertical flexing or undulation, such as to accommodate changes in ground terrain.

As shown by FIGS. 2 and 3, in addition to mount 20, sickle 54 further comprises sickle bar 56, knife sections 58, extension bar 60 and fasteners 62. Sickle bar 56, sometimes referred to as a knife backing, comprises an elongate bar to which knife sections 58 are fastened or mounted. In one implementation, sickle bar 56 extends along an entire swath or width of the head of the implement employing sickle 54. In another implementation, sickle bar 56 extends across a portion of the total width of the head of the implement, where the implement may employ an opposite sickle from the other side of the head.

Sickle bar 56 is vertically flexible so as to flex and bend or undulate to accommodate changes in the underlying terrain. In one implementation, sickle bar 56 has a modulus of elasticity so as to be vertically flexible so as to have an undulating shape along its length with height variations of at least 6 inches without permanent deformation or damage to sickle bar 56. In other implementations, sickle bar 56 may be formed from materials and may have dimensions so as to provide at least 6 inches of height variation along an undulating shape of sickle bar 56.

Knife sections 58 comprise individual cutting plates secured to sickle bar 56. In the example illustrated, knife sections 58 have generally triangular cutting blades with angled cutting edges or sides. In some implementations, a single knife section may comprise a single triangular cutting blade or multiple cutting blades. Knife sections 58 facilitate repair and replacement of individual sections of sickle 54. In the example illustrated, knife sections 58 extend along a substantial length of sickle bar 56. As shown by FIGS. 2 and 3, some of knife sections 58 are captured between sickle bar 56 and arm 24 or between sickle bar 56 and extension arm 60.

Extension bar 60 comprises a bar extending from arm 24 along and parallel to sickle bar 56. Extension bar 60 further rigidifies an additional length of sickle bar 56. In the example illustrated, extension bar 60 provides an intermediate degree of stiffness, greater than that of sickle bar 56 but less than that of arm 24. Extension bar 60 has a first portion received within portion 34 of channel 32 and a second portion extending beyond arm 24 along sickle bar 56. In some implementations, extension bar 60 may be omitted.

Fasteners 62 secure sickle bar 56 to arm four and extension arm 62. Fasteners 62, the same length a different length, further secure knife sections 58 to sickle bar 56 along the length of sickle bar 56. In one implementation, fasteners 62 each comprise a bolt and nut combination. In yet other implementations, fasteners 62 may comprise other types of fasteners.

As indicated above, sickle bar drive mount 20 and sickle 54 are well-suited for use in flexible cutting platforms for harvesters or combines. Such flexible cutting platforms have a floor upon which the cut or severed crop material lands and is moved to a central feed drum or other device that moves the crop material to a feeder housing of the harvester for subsequent cleaning and threshing. In some cutting platforms, the floor comprises flat panels, such as stainless steel sheet metal panels, wherein augers, near the rear of the floor, transversely convey the cut or severed crop material to the central feed drum. In other cutting platforms, the floor comprises endless belts or drapers that transversely convey the cut or severed crop material to a central auger or feeding belt that moves the cut or severed crop material to the feed drum.

FIGS. 4-9 illustrate an example agricultural combine or harvester 110 having a header in the form of a flexible cutting platform 112. Flexible cutting platform 112 comprises sickle bar drive mount 20 and sickle 54 described above. Although sickle bar drive mount 20 and sickle 54 are described in one example is being utilized with harvester 110, sickle bar drive mount 20 and 654 may be utilized as part of other flexible cutting platforms for harvesters. Another example of a flexible cutting platform that may utilize sickle bar drive mount 20 and sickle 24 is described in co-pending U.S. patent application Ser. No. 13/017,589 filed on Jan. 31, 2011 by Coers et al and entitled "Flexible Cutting Platform to Follow Ground Contour in an Agricultural Harvesting Machine", the full disclosure of which is hereby incorporated by reference.

Figure 4:
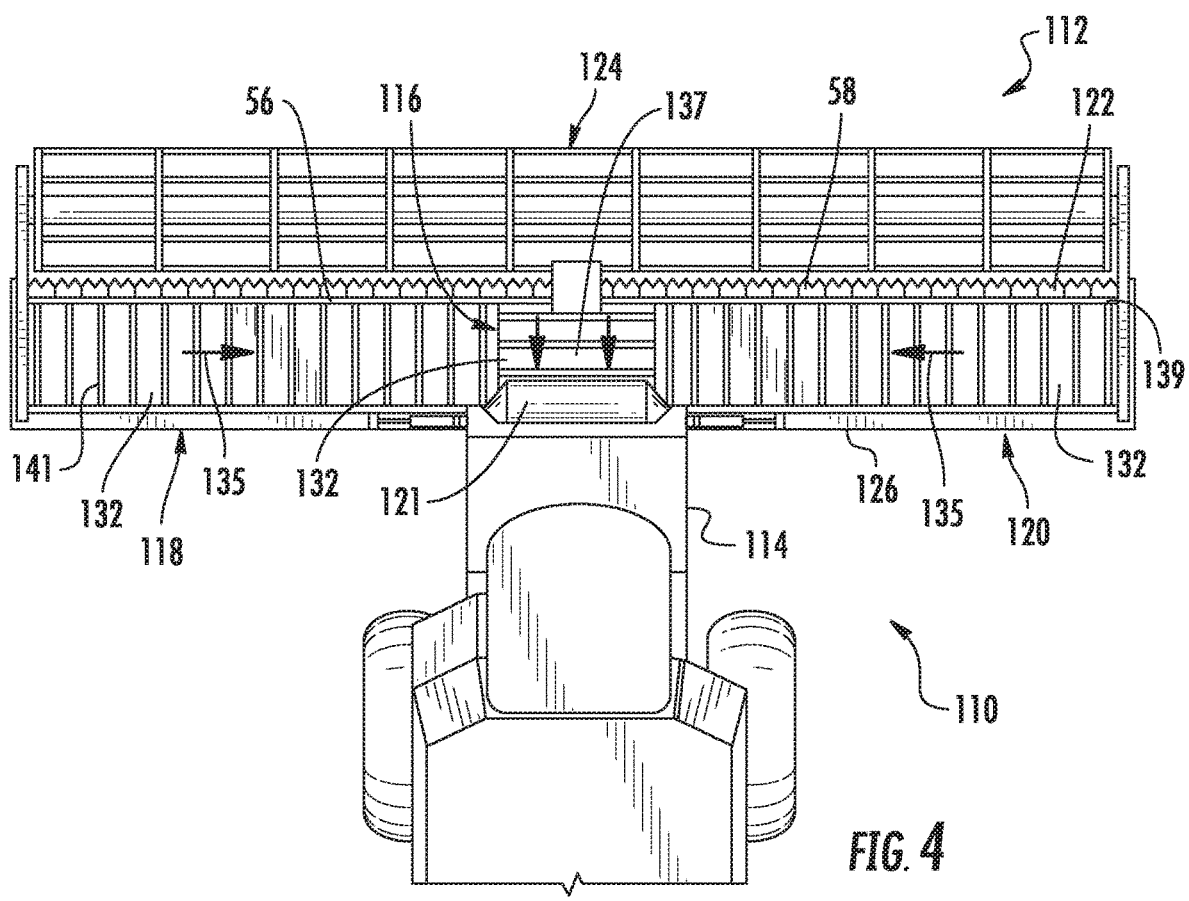
FIG. 4 is a top view of an example harvester having an example flexible cutting platform comprising the example sickle of FIGS. 2 and 3.

As shown by FIG. 4, harvester 110 comprises a feeder housing 114 which is detachably coupled with cutting platform 112. Feeder housing 114 receives the crop material from cutting platform 112, both grain and non-grain crop material, and transports the crop material to a separator within harvester 110. The grain crop material is separated from the non-grain crop material, cleaned and transported to a grain tank. The non-grain crop material is transported to a chopper, blower, etc. and distributed back to the field.

Cutting platform 112 generally includes a plurality of platform sections 116, 118 and 120, a feed drum 121, a cutter assembly 122 and a reel 124. In the embodiment shown, platform section 116 is a center platform section, platform section 118 is a first wing platform section, and platform section 120 is a second wing platform section. Although shown with three platform sections, cutting platform 112 may be configured with more or less platform sections, depending upon the particular application.

Figure 8:
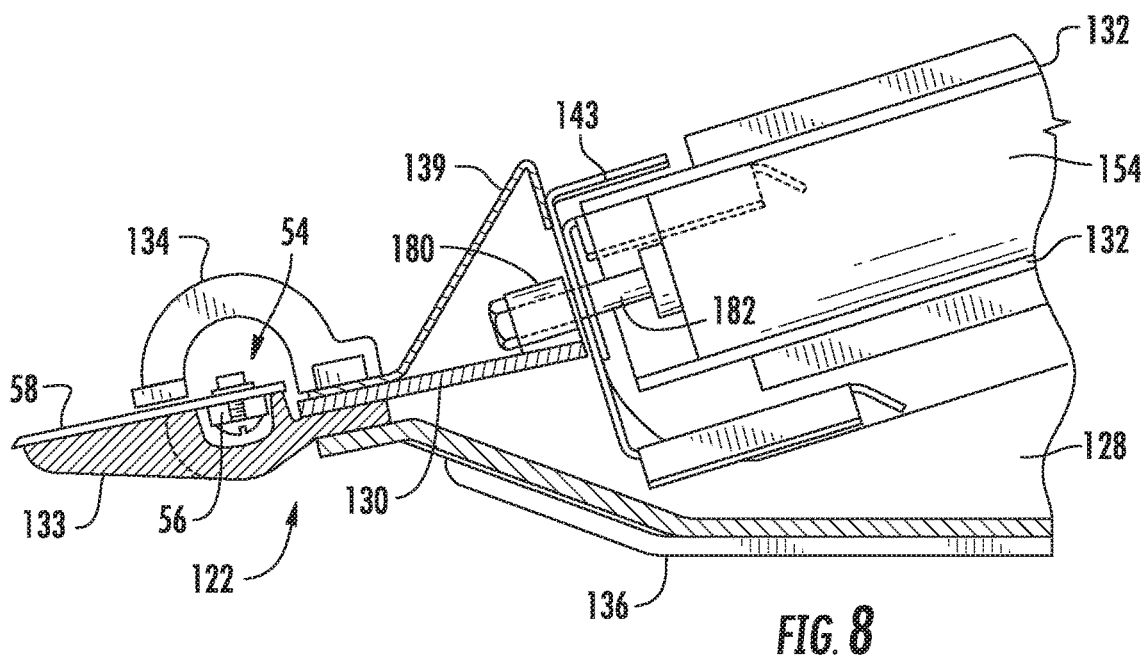
FIG. 8 is a sectional view of a portion of the flexible cutting platform of FIG. 4.
Figure 9:
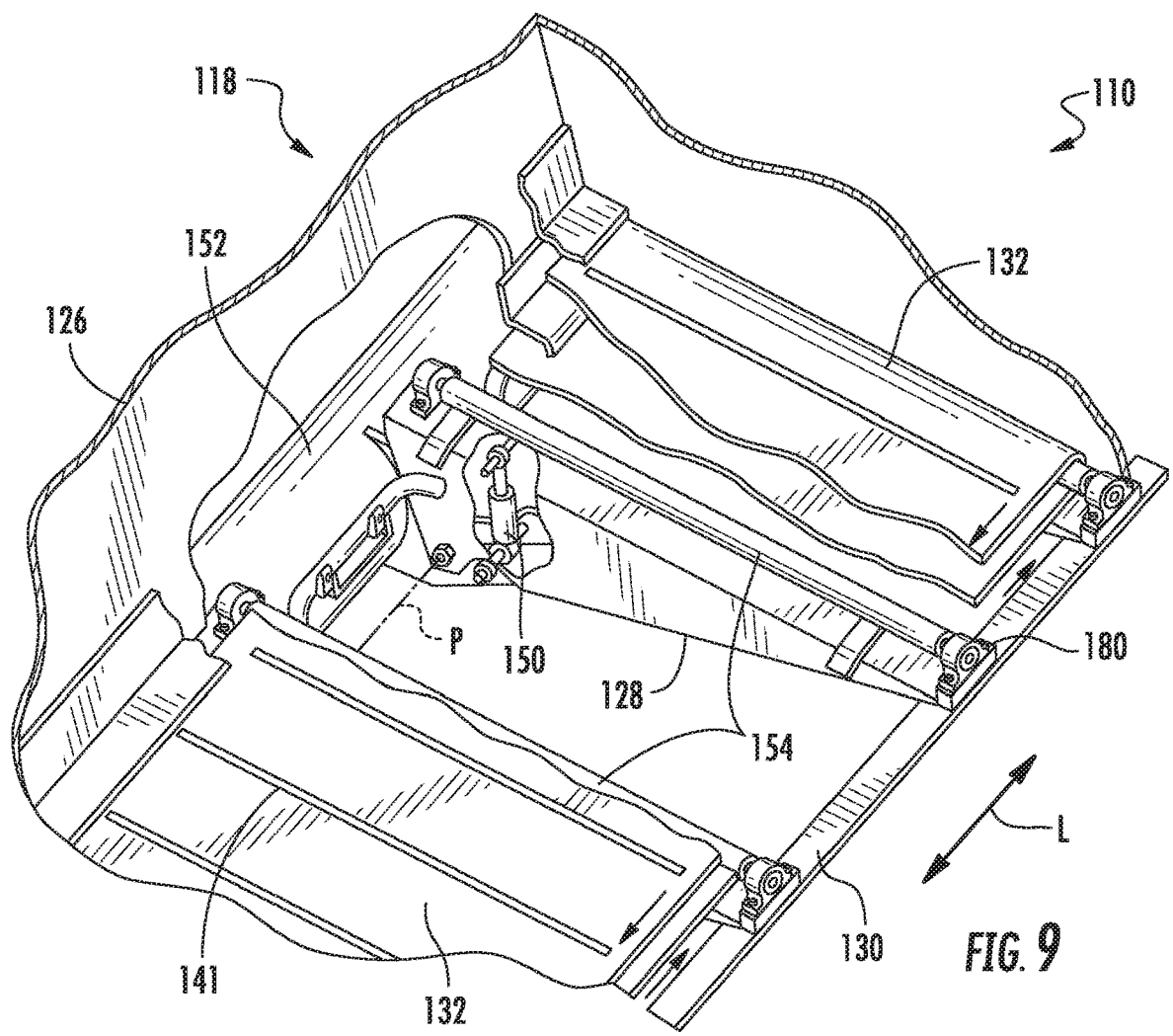
FIG. 9 is a fragmentary top perspective view illustrating a portion of the flexible cutting platform of FIG. 4.

As shown by FIGS. 8 and 9, each platform section 116, 118 and 120 generally includes a frame 126 (shown in FIG. 9), a plurality of float arms 128 coupled with a respective frame 126, an endless belt 132, a plurality of belt guides 143 and a plurality of crop ramps 139. The frame 126 of first wing platform section 118 and second wing platform section 120 are each pivotally coupled with center platform section 116, such that the outboard ends of first wing platform section 118 and second wing platform section 120 can move up and down independent from center platform section 116. In one implementation, hydraulic cylinder assemblies but for not shown) may be used to raise and lower sections 118 and 120.

Belts 132 convey crop material. Belts 132 comprise cleats 141 to engage crop material. Each of belts 132 is tracked and guided by corresponding belt guides 143. Belts 132 of sections 118 and 120 are driven to transversely convey cut crop material towards section 116 as indicated by arrows 135. As indicated by arrows 137, belt 132 of section 116 is longitudinally driven to convey cut crop material rearwardly towards feed drum 121. Feed drum 121 is rotatably driven to move the cut crop material rearwardly to feeder housing 114 of harvester 110.

Crop ramps 139 are overlapped but not rigidly attached to each other, thereby allowing flexure during harvesting operation. Each crop ramp 139 forms an upper ledge positioned above endless belt 132 which assists in maintaining the crop material on endless belt 32 as it is transported toward feeder housing 114. In the embodiment shown in FIGS. 5 and 8, crop ramp 139 has a flat, angled orientation to assist in transport of the crop material from cutter system 122 to endless belt 132. For certain applications, it may be possible to eliminate crop ramps 139.

As shown by FIG. 4, reel 124 is rotatably supported at the leading edge of platform 112, generally in front of cutter assembly 122. Reel 124 is rotatably driven to gather and direct crop into engagement with cutter assembly 122 which severs the crop. In some implementations, platform 124 may comprise a plurality of independently actuatable reels 124 for directing crop towards at least one cutter assembly 122. At least one cutter assembly 122 extends along the front or leading edge of each of sections 116, 118 and 120. In one implementation, platform 112 comprises a pair of cutter assemblies 122, a cutter assembly 122 extending from each transverse end of platform 112. In another implementation, platform 112 comprises a single cutter assembly 122 that extends across the entire width of platform 112.

Figure 5:
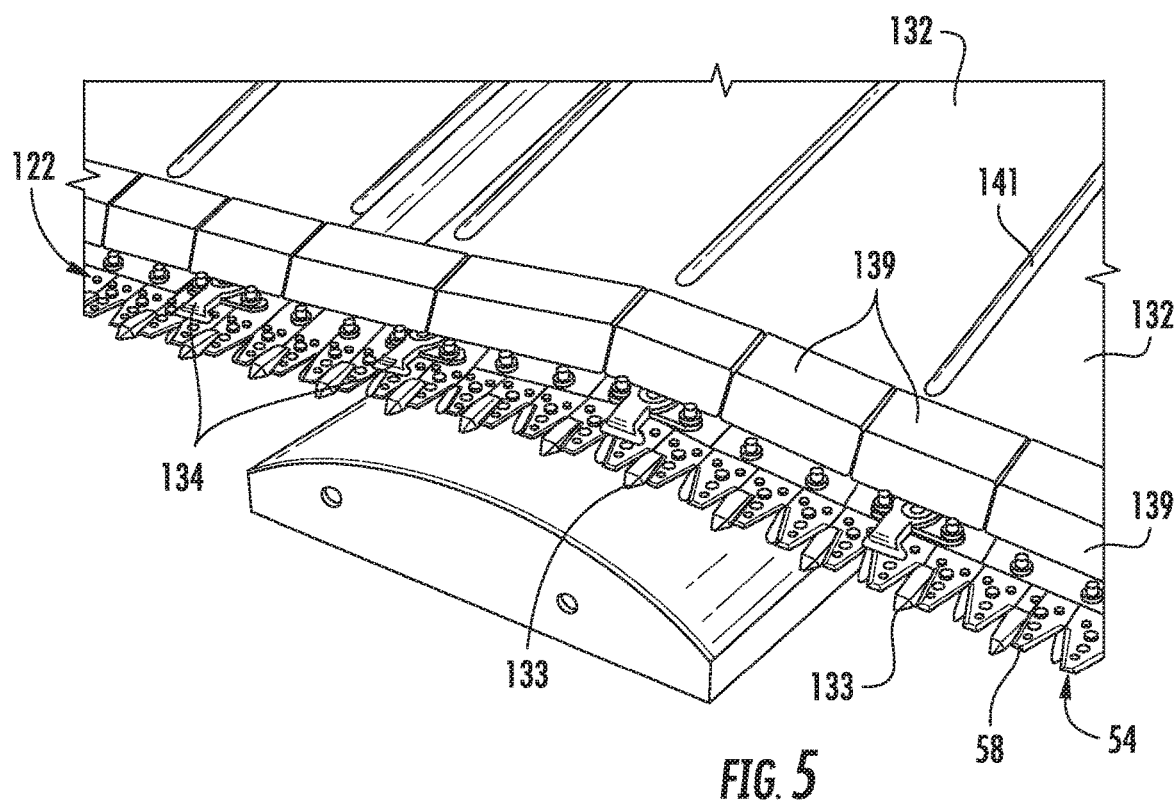
FIG. 5 is a fragmentary perspective view of a portion of the flexible cutting platform of FIG. 4 during localized vertical flexing or undulation of the flexible cutting platform.
Figure 6:
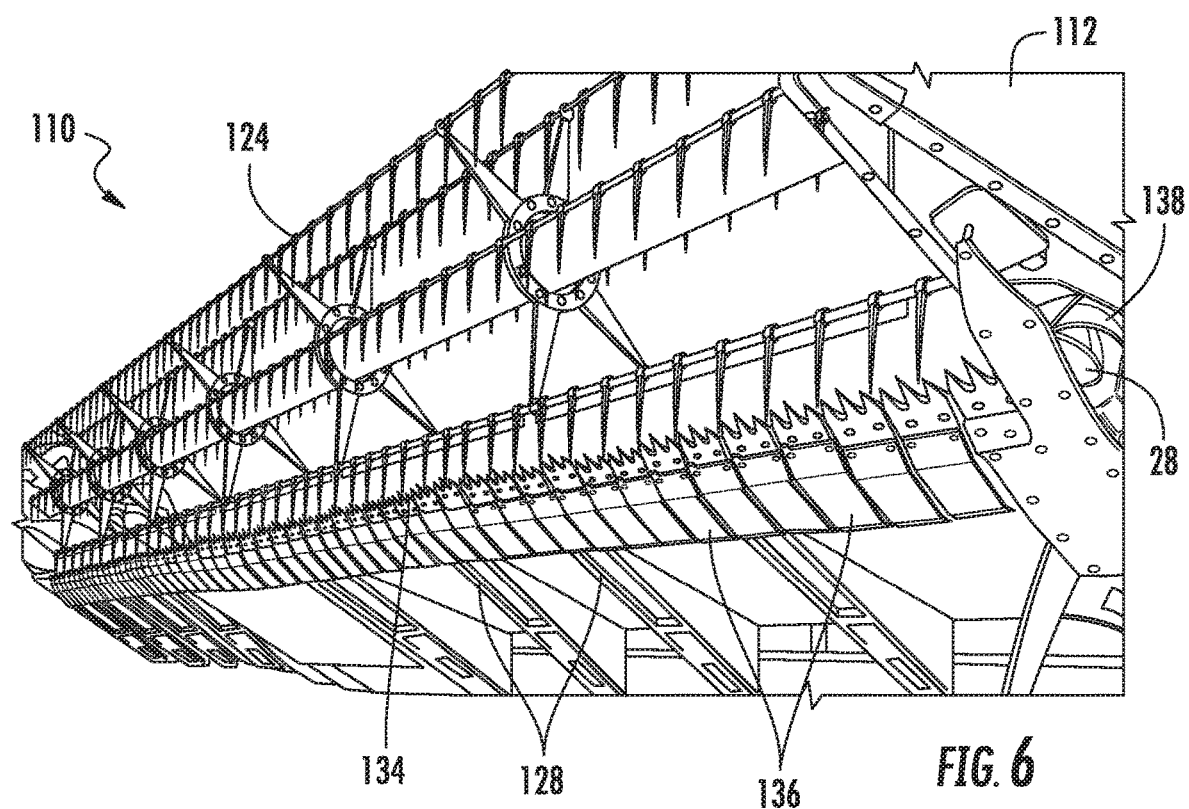
FIG. 6 is a bottom perspective view of the flexible cutting platform of FIG. 4.
Figure 7:
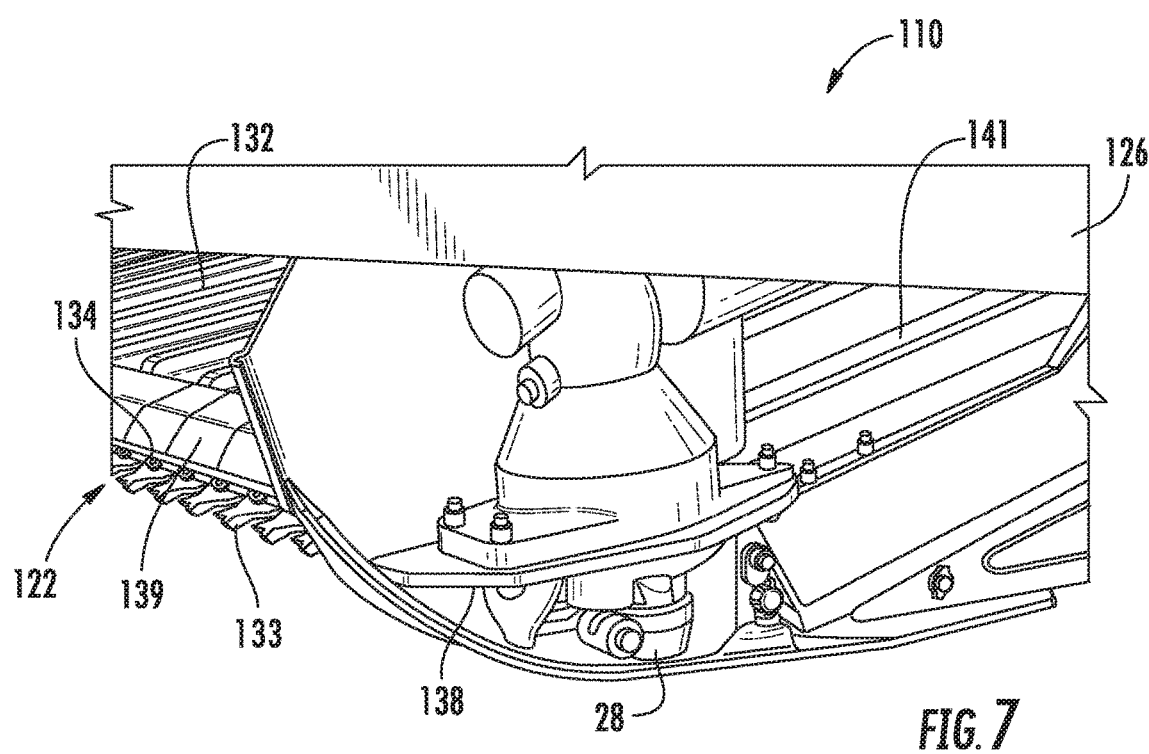
FIG. 7 is an end perspective view of the flexible cutting platform of FIG. 4.

As shown by FIGS. 5-8, each cutter assembly 122 comprises a flexible cutter bar 130, knife guards 133, hold downs or keepers 134, skid shoes 136, a sickle 54 (described above) and a shared sickle drive 138 (shown in FIGS. 6 and 7). Cutter bar 130 comprises an elongate flexible bar extending along the leading edge of platform 112. In the example illustrated, cutter bar 130 is supported by both float arms 128 extending from frame 126 and by skid shoes 136. In other implementations, cutter bar 130 may be supported solely by skid shoes 136.

As with sickle bar 56, cutter bar 130 has a modulus of elasticity so as to be vertically flexible so as to flex and bend or undulate to accommodate changes in the underlying terrain. In one implementation, cutter bar 130 is vertically flexible so as to have an undulating shape along its length with height variations of at least 6 inches without permanent deformation or damage to cutter bar 130. In one implementation, cutter bar 130 is formed from a material such as spring steel with a thickness of between 6 mm and a width of between 13 mm. In other implementations, cutter bar 130 may be formed from other materials and may have other dimensions so as to provide at least 6 inches of height variation along an undulating shape of cutter bar 130.

In implementations where platform 112 comprises a pair of cutter assemblies 122, a majority of each cutter bar 130 is carried by a respective first wing platform section 118 or second wing platform section 120, with a lesser extent at the adjacent inboard ends of each cutter bar 130 being carried by center platform section 116. Likewise, a majority of each sickle bar 56 is carried by a respective first wing platform section 118 or second wing platform section 120, with a lesser extent at the adjacent inboard ends of each sickle bar 56 being carried by center platform section 116. The two sickle bars 56 are simultaneously driven by a single sickle drive 138, providing reciprocating movement in concurrent opposite directions between sickle bars 56. It is also possible to reciprocally sickle bars 56 with multiple sickle drives 138, which can be positioned at the adjacent, inboard ends or the outboard ends of sickle bars 56.

As shown by FIG. 5, knife guards 133 are positioned in opposition to knife sections 58 for providing opposing surfaces for cutting the crop material with knife sections 58. Keepers 134 are mounted to cutter bar 130 of spaced intervals. Each of keepers 134 has a distal end above sickle bar 56 to maintain sickle bar 56 in place during reciprocating movement.

As shown by FIGS. 6 and 8, skid shoes 136, comprise members that are coupled to flexible cutter bar 130 and that project rearwardly from cutter bar 130 so as to extend into engagement with the ground terrain when platform 112 is lowered for harvesting. Skid shoes 136 communicate changes in the ground terrain to localized portions of cutter bar 130, causing individual corresponding portions of cutter bar 130 to vertically flex in response to changes in ground terrain. In one implementation, each of skid shoes 136 comprises a distinct rearwardly extending angled plate. In one implementation, each of skid shoes 136 has a width of between 4 and 10 inches. In other implementations, skid shoes 136 may have other dimensions.

FIG. 5 illustrates skid shoes 136 along a local portion, a distinct portion, of platform 112 for transmitting changes in ground terrain height to cutter bar 130 to vertically flex such localized portions of cutter bar 130. As cutter bar 130 flexes, the components carried by cutter bar 130 also flex and potentially undulate. As further shown by FIG. 5, those components supported or carried by cutter bar 130 are also vertically raised or lowered in response to such vertical flexure of cutter bar 130. Knife guards 133 and keepers 134 also are raised and lowered. As the knife guards 133 and keepers 134 experience changes in vertical height due to the flexing of cutter bar 130, sickle bar 56, carrying knife sections 58, also correspondingly flexes. In particular, the knife guards 133 and keepers 134 raise and lower sickle bar 56 and knife sections 58 such that localized portions of sickle bar 56 also raise and lower.

Sickle drive 138 comprises an actuator that linearly reciprocates sickle 54 along the leading edge of platform 112. Sickle drive 138 is operably coupled to sickle bar 56 by sickle bar drive mount 20, described above. Sickle drive 138 reciprocates sickle 54 back and forth even when sickle bar 56 is in an undulating state, such as shown in FIG. 5, to continue cutting crop material. In one implementation, sickle drive 138 comprises an epicentric drive in which the cylindrical bearing is eccentrically rotated are driven about an axis to impart reciprocating linear motion to the attached sickle bar 56. In implementations where platform 112 employs a pair of sickles 54 extending from opposite ends of platform 112, the two sickles 54 may be connected by a pivoting rocker shaft, facilitating reciprocation of both sickles 54 by the shared drive 138. In such implementations, the two sickles may alternatively be driven by separate dedicated sickle drives. In other implementations, sickle drive 138 may comprise other types of actuators to linearly reciprocate sickle bar 56.

As shown by FIGS. 6, 8 and 9, float arms 128 comprise structures extending between frame 126 and flexible cutter bar 130. For ease of illustration, FIG. 9 omits the knife guards and keepers otherwise supported by cutter bar 130. Float arms 128 assist in floating and supporting cutter bar 130. Float arms 128 further support rollers 154 which guide and support belts 132, facilitating the floating of belts 132. In some implementations, float arms 128 may be omitted.

As shown by FIG. 9, each of float arms 128 may be pivoted at their connection locations with frame 126. A float cylinder 150 coupled between a respective frame 126 and float arm 128 may be used for raising or lowering the outboard end of float arm(s) 128 at the leading edge of cutting platform 112. Each float cylinder 150 may also be placed in a "float" position allowing the connected float arm 128 to generally follow the ground contour during operation. More particularly, each float cylinder 150 is fluidly connected with an accumulator 152 carried by a platform section 116, 118 or 120. Accumulator 152 allows fluid to flow to and from attached float cylinders 150 such that no pressure build-up occurs. In this manner, the rams associated with each float cylinder 150 are free to move back and forth longitudinally, thereby allowing float arms 128 to follow the ground contour. When not in a float mode, float cylinders 150 can be actuated to move float arms 128 in an upward or downward direction. In the embodiment shown, each float cylinder 150 is a hydraulic cylinder, but could possibly be configured as a gas cylinder for a particular application. In some implementations, float cylinders 150 may alternatively comprise other bias mechanism such as springs or may be omitted.

As shown by FIGS. 8 and 9, each float arm 128 is also associated with a respective roller 154. The plurality of rollers 154 for each platform section 116, 118 and 120 carry and are positioned within a loop of a respective endless belt 132. At the inboard end of first wing platform section 118 and second wing platform section 120 is a driven roller, and at the outboard end of first wing platform section 118 and second wing platform section 120 is an idler roller. The rollers positioned between the inboard drive roller and outboard idler roller at each float arm 128 also function as idler rollers. It will be appreciated that the number of float arms 128, and thus the number of rollers 154, may vary depending upon the overall width of cutting head 112 transverse to the travel direction. A bushing housing 180, also mounted to cutter bar 130, carries a bushing (not shown) which in turn carries a mount 182 for rotatably supporting roller 154.

During harvesting operation, float arms 128 are placed in a float state allowing free upward and downward movement as harvester 110 traverses over the ground surface. Cutter assembly 122 moves up and down with float arms 128 on a localized basis, and crop ramps 139 and belt guides 143 move relative to each other to allow the flexibility at the leading edge of each platform section 116, 118 and 120. Belt guides 143 also cause each belt 132 to follow the cutter assembly by holding down on the upper surface of the belt as cutter assembly 122 locally dips downward. This prevents crop material from entering beneath belt 132.

Figure 10:
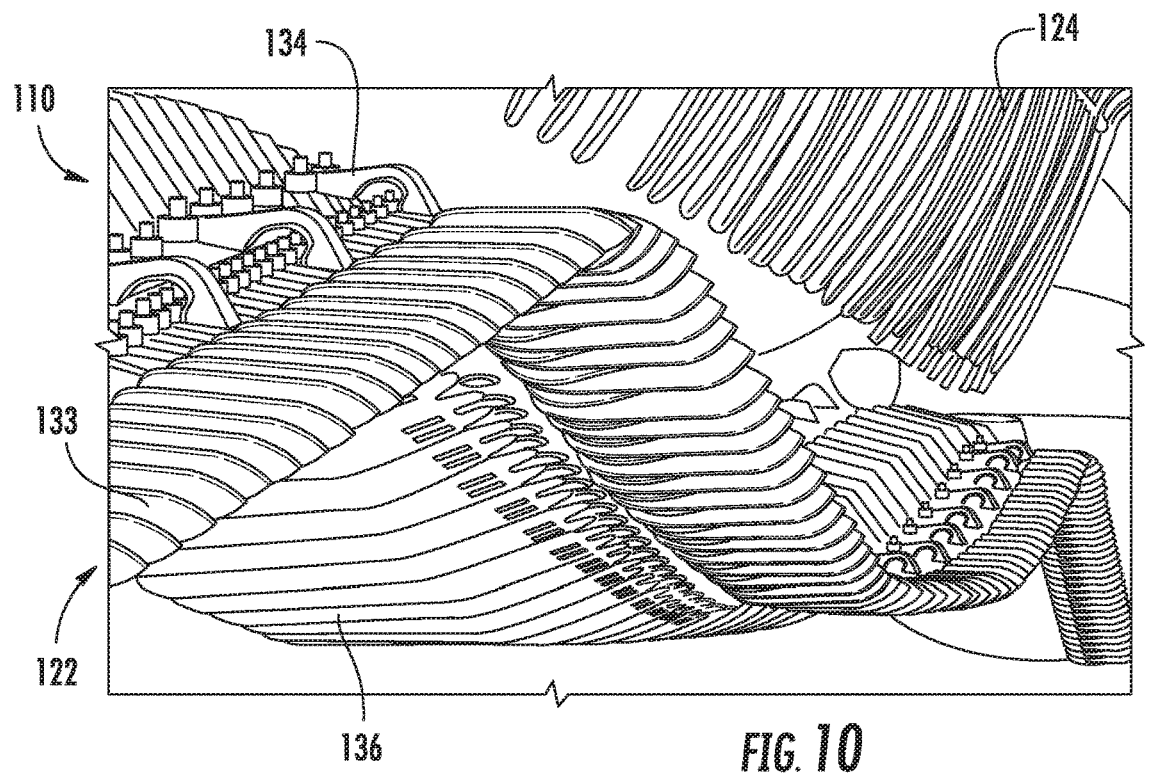
FIG. 10 is a bottom perspective view of a portion of the flexible cutting platform of FIG. 4 in an undulated state.
Figure 11:
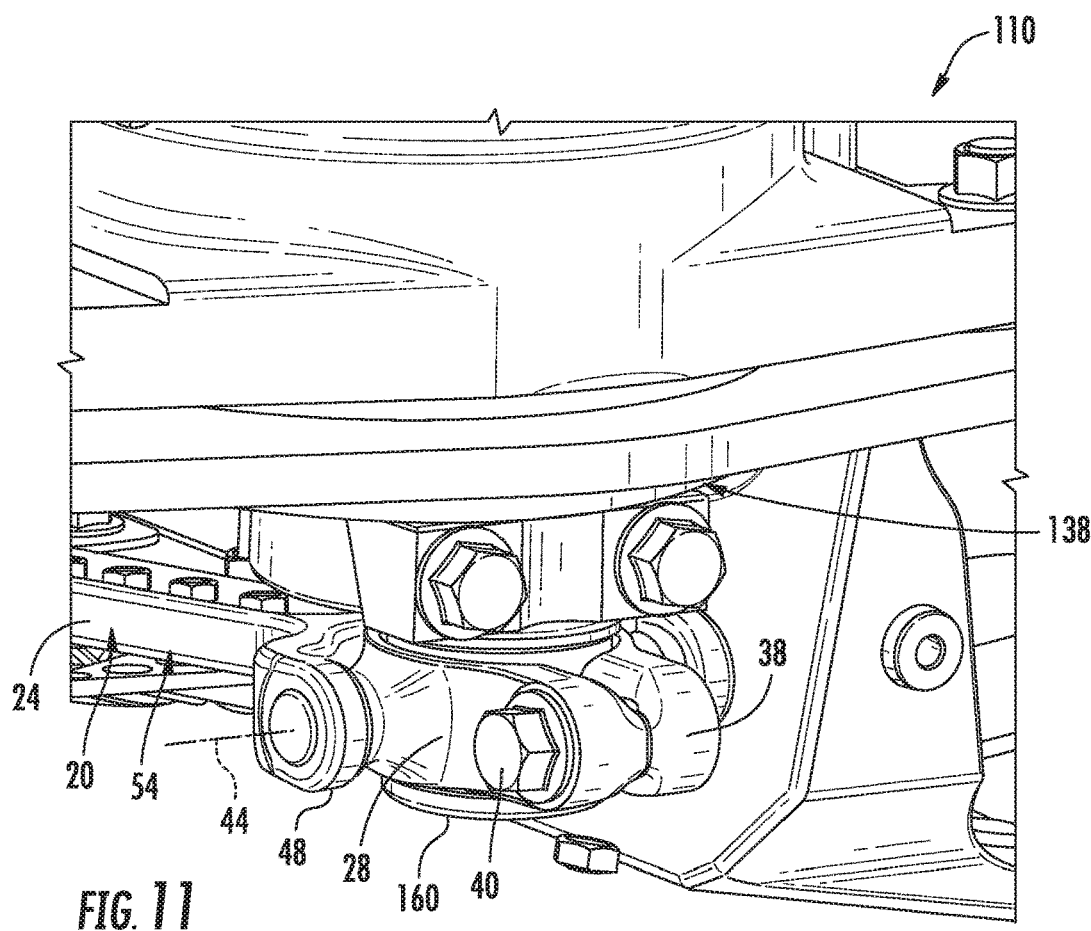
FIG. 11 is a fragmentary perspective view of the flexible cutting platform of FIG. 4 illustrating the sickle bar drive mount in a non-articulated state.
Figure 12:
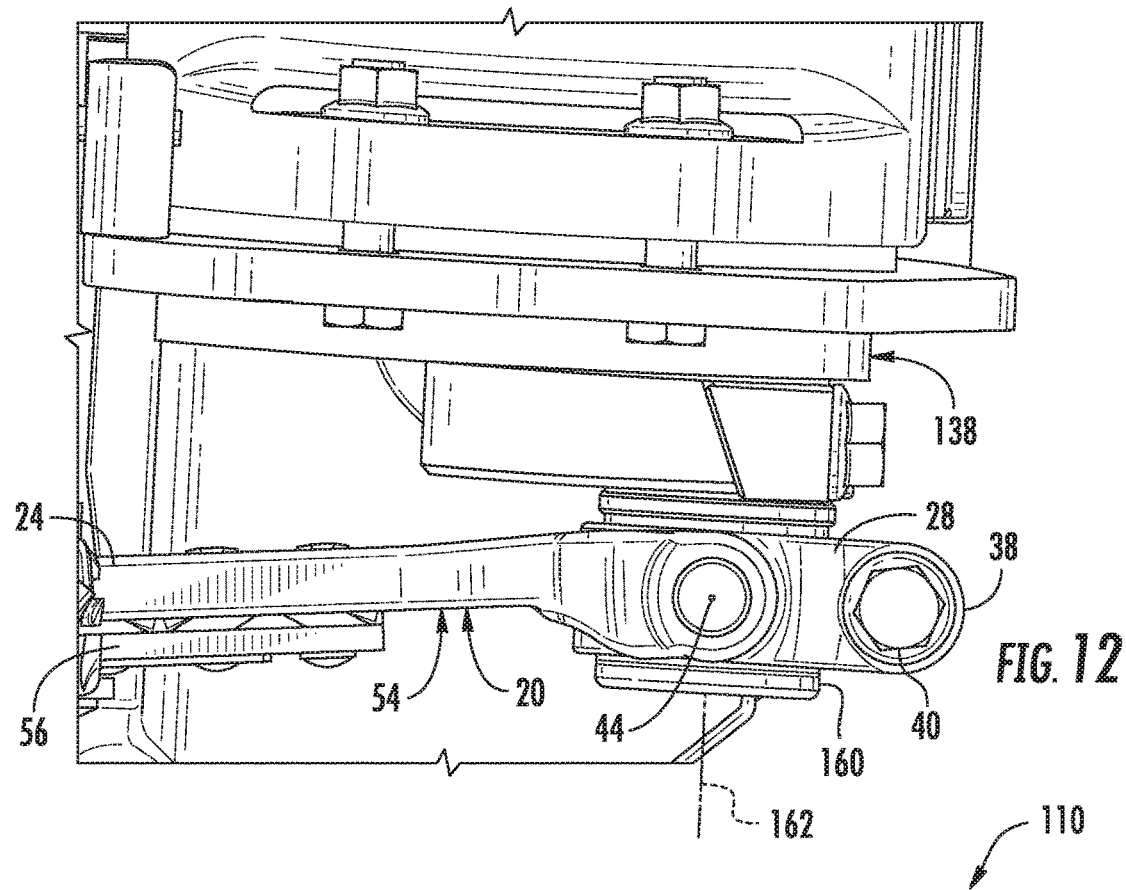
FIGS. 12 and 13 are perspective views of the flexible cutting platform of FIG. 4 illustrating the sickle bar drive mount in an articulated state as a result of undulation of a sickle bar of the sickle.
Figure 13:
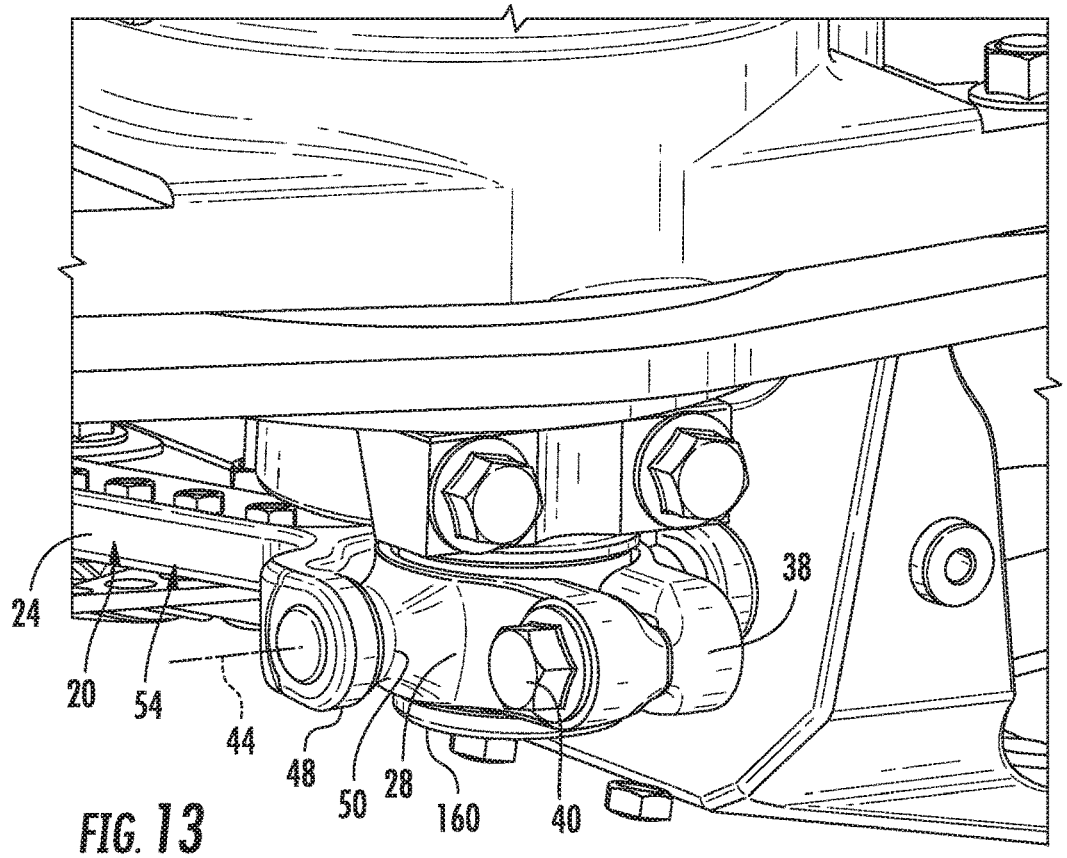

FIG. 5 illustrates an example of cutter assembly 122 vertically flexing and undulating in response to changes in underlying ground train. FIG. 10 further illustrates an example of a degree to which cutter assembly 122 may undulate. During such undulation, sickle bar 56 also vertically flexes and undulates. FIGS. 11-13 illustrate sickle bar drive mount 20 accommodating such undulation of sickle bar 56 to reduce stress on the connection between sickle 54 and the cylindrical bearing 160 of sick the drive 138.

FIG. 11 illustrates sickle 54 in a substantially flat or non-undulated state, wherein sickle bar drive mount 20 is in a non-articulated state. FIGS. 12 and 13 illustrate sickle 54 in a vertically flexed and undulated state, with sickle bar drive mount 20 in an articulate state, as a result of localized changes in the height of the underlying ground train along the transverse width of section 112. As shown by FIGS. 12 and 13, the pivotal connection of arm 24 with respect to eye 28 facilitates the angling of arm 24 along with sickle bar 56 while eye 28 remain substantially centered and perpendicular to the generally vertical axis 162 of bearing 160. As shown by FIGS. 12 and 13, arm 24 and sickle bar 56 are allowed to pivot about axis 44 as needed to accommodate the undulation of sickle 54. As a result, the connection between mount 20 and sickle drive 138 is less prone to slippage and potential damage.

Figure 14:
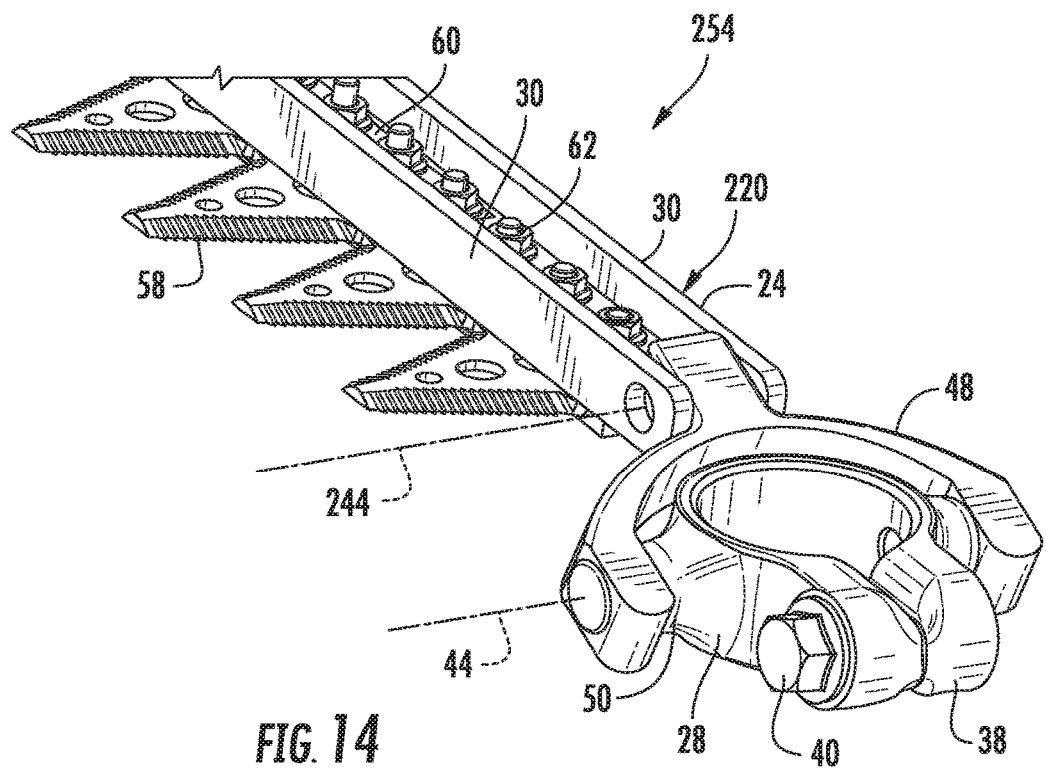
FIG. 14 is a fragmentary perspective view of another example sickle having another example sickle bar drive mount.
Figure 15:
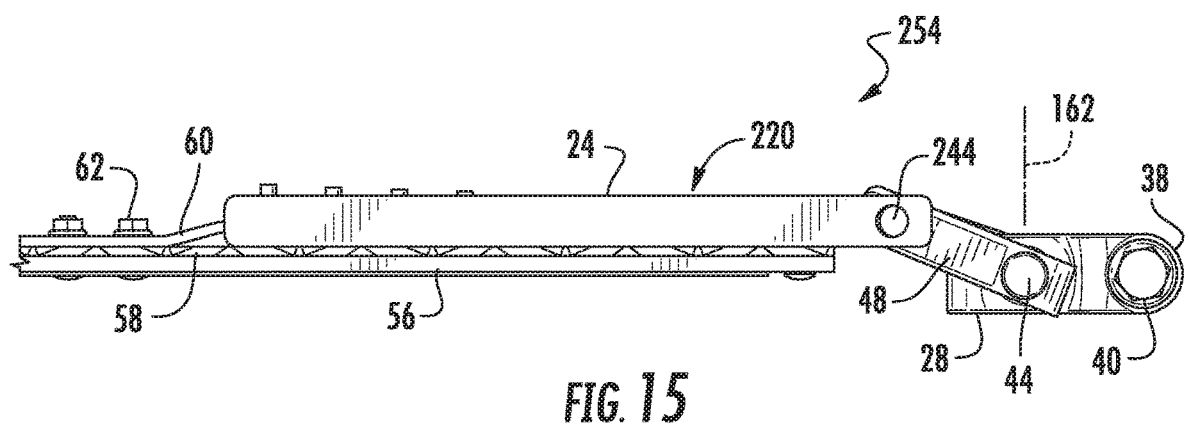
FIG. 15 is a fragmentary side view of the sickle of FIG. 14.

FIGS. 14 and 15 illustrate another example sickle bar drive mount 220 provided as part of a sickle 254. Sickle bar drive mount 220 and sickle 254 may be utilized in harvester 110 described above as well as any other flexible cutting platforms or other agricultural implements having a sickle that vertically flexes and undulates in localized regions such as to accommodate changes in underlying ground train. Sickle bar drive mount 220 and sickle 254 are similar to sickle bar drive mount 20 and sickle 54 described above except that sickle bar drive mount 220 additionally comprises a pivotal connection between trunnion 48 and arm 24.

Those components of sickle bar drive mount 220 and sickle 254 which correspond to components of sickle bar drive mount 20 and sickle 54 are numbered similarly.

As shown by FIGS. 14 and 15, trunnion 48 is pivotally connected to arm 24 for pivotal movement about axis 244. In the example illustrated, walls 30 of arm 24 form an opening to receive trunnion 48, wherein a pin (not shown) passes through trunnion 48 and arms 30 to pivotally connect trunnion 48 to arm 24 for pivotal movement about axis 244. In other implementations, trunnion 48 may be pivotally connected to arm 24 in other fashions. Axis 244 extends parallel to axis 44, in the same plane along which arm 24 extends and in a plane containing axis 44 or parallel to axis 44.

Figure 16:
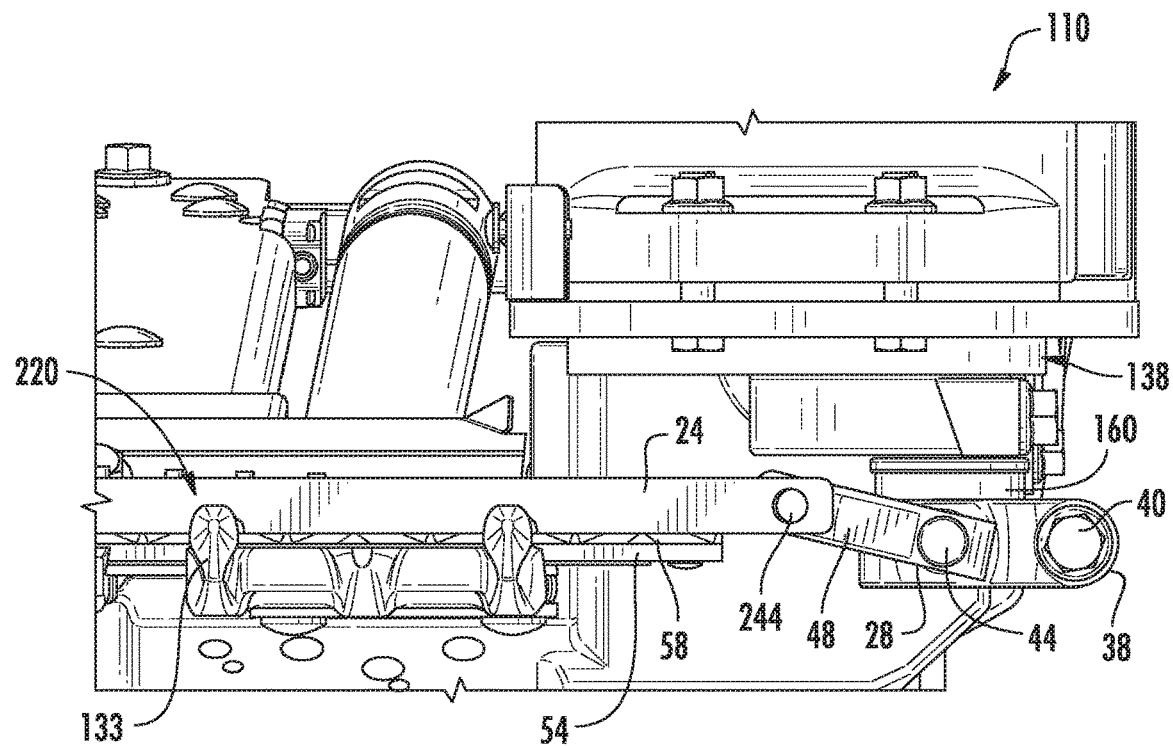
FIG. 16 is a fragmentary perspective view of the example flexible cutting platform of FIG. 4 with the sickle of FIGS. 14 and 15, illustrating the sickle bar drive mount of FIG. 14 in an articulated state.
Figure 17:
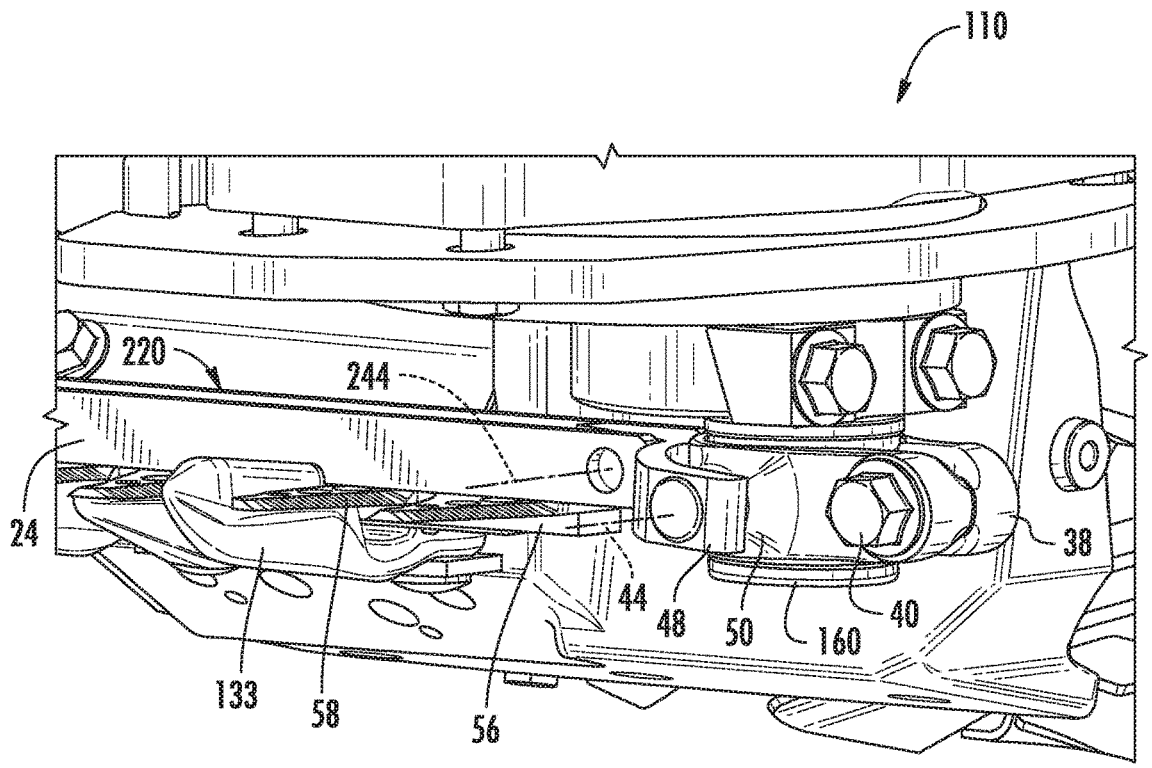
FIG. 17 is a fragmentary perspective view of the example flexible cutting platform of FIG. 4 with the sickle of FIGS. 14 and 15, illustrating the sickle bar drive mount of FIG. 14 in a non-articulated state.

FIGS. 16 and 17 illustrate sickle bar drive mount 220 and sickle 254 utilized in harvester 110 in place of sickle bar drive mount 20 and sickle 54. FIG. 16 illustrates sickle bar drive mount 220 in a pivoted or articulated state in which arm 24 has pivoted relative to trunnion 48 about axis 244 to further accommodate and respond to localized vertical flexing and undulation of sickle bar 56 to which mount 220 is connected. FIG. 17 illustrates sickle bar drive mount 220 in a non-pivoted or non-articulated state. In each of such states, sickle bar drive 138 linearly reciprocates sickle bar 54, and the attached knife sections 58. However, the additional articulation provided by the pivotal connection of trunnion 48 and arm 24 provide additional accommodation to further reduce stress upon the connection between eye 28 and bearing 160 of sickle bar drive 138. As shown by the comparison of FIGS. 12 and 16, the additional articulation may maintain the end portion of sickle bar 54 in a more level orientation despite such undulation.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompasses a plurality of such particular elements.

What is claimed is:

1. A sickle bar drive mount comprising:
   an arm mountable to a horizontally extending flexible sickle bar, the arm to extend along a first horizontal axis parallel to the flexible sickle bar; and
   a sickle bar drive eye to receive a sickle bar drive bearing of the sickle bar drive, the sickle bar drive eye being pivotally coupled to the arm for pivotal movement about a second horizontal axis perpendicular to the first axis to accommodate vertical flexing and undulation of the flexible sickle bar.

2. The sickle bar drive mount of claim 1 further comprising a trunnion extending from the arm and pivotably supporting the sickle bar drive eye about the second horizontal axis.

3. A sickle bar drive mount comprising:
   an arm mountable to a horizontally extending sickle bar, the arm to extend along a first horizontal axis parallel to the sickle bar;
   a sickle bar drive eye to receive a sickle bar drive bearing of the sickle bar drive, the sickle bar drive eye being pivotally coupled to the arm for pivotal movement about a second horizontal axis perpendicular to the first axis; and
   a trunnion extending from the arm and pivotably supporting the sickle bar drive eye about the second horizontal axis, wherein the trunnion is pivotably coupled to the arm about a third horizontal axis parallel to the second horizontal axis.

4. The sickle bar drive mount of claim 1, wherein the arm comprises mounting apertures spaced along the first horizontal axis for mounting the arm to the sickle bar.

5. The sickle bar drive mount of claim 1, wherein the first axis and the second axis extend in a single plane.

6. A cutter assembly comprising:
   a flexible sickle bar extending in a horizontal plane;
   knife sections mounted to and along the sickle bar;
   a flexible sickle bar drive mount coupled to the flexible sickle bar, the sickle bar drive mount comprising:
      an arm extending along a first horizontal axis and mounted to the flexible sickle bar;
      a sickle bar drive eye to be connected to a sickle bar drive, the sickle bar drive eye being pivotally coupled to the arm for pivotal movement about a second horizontal axis perpendicular to the first axis to accommodate vertical flexing and undulation of the flexible sickle bar.

7. The cutter assembly of claim 6 further comprising a trunnion extending from the arm and pivotably supporting the sickle bar drive eye about the second horizontal axis.

8. The cutter assembly of claim 7, wherein the trunnion is pivotably coupled to the arm about a third horizontal axis parallel to the second horizontal axis.

9. The cutter assembly of claim 6 further comprising:
   a flexible cutter bar;
   knife guards supported by the flexible cutter bar, at least some of the knife guards comprising a knife channel through which the knife sections reciprocate.

10. The cutter assembly of claim 7 further comprising the sickle drive to reciprocatively drive the flexible sickle bar, the sickle drive having a sickle drive bearing received within the sickle bar drive eye.

11. The cutter assembly of claim 10 further comprising the sickle drive.

12. The cutter assembly of claim 6 further comprising skid shoes coupled to the flexible cutter bar to raise and lower localized portions of the flexible cutter bar in response to localized changes in ground terrain.

13. The cutter assembly of claim 6, wherein the flexible sickle bar is sufficiently flexible so as to have an undulating shape along its length with height variations of at least 6 inches.

14. A flexible cutting platform for a harvester, the cutting platform comprising:
   a frame;
   a platform floor supported by the frame;
   a flexible cutter bar supporting a plurality of knife guards;
   a plurality of ground engaging members that float along the ground terrain, the plurality of ground engaging members coupled to the flexible cutter bar to vertically flex localized portions of the cutter bar in response to changes in ground terrain;

a sickle drive; and a sickle comprising a flexible sickle bar supporting a plurality of knife sections passable through the knife guards such that reciprocation of the sickle by the sickle drive is guided by the knife guards; and a flexible sickle bar drive mount coupled to the sickle bar, the sickle bar drive mount comprising:

an arm coupled to the flexible sickle bar, the arm extending along a first horizontal axis parallel to the flexible sickle bar;

a sickle bar drive eye receiving a sickle bar drive bearing of the sickle bar drive, the sickle bar drive eye being pivotally coupled to the arm for pivotal movement about a second horizontal axis perpendicular to the first axis.

15. The flexible cutting platform of claim 14 further comprising a trunnion extending from the arm and pivotably supporting the sickle bar drive by about the second horizontal axis.

16. The flexible cutting platform of claim 15, wherein the trunnion is pivotably coupled to the arm about a third horizontal axis parallel to the second horizontal axis.

17. The flexible cutting platform of claim 14, wherein the flexible sickle bar and the flexible cutter bar are each sufficiently flexible so as to have an undulating shape along its length with height variations of at least 6 inches.

18. The flexible cutting platform of claim 14, wherein the platform floor comprises a draper belt.

19. The flexible cutting platform of claim 14 further comprising resilient biasing mechanisms operably coupled between the frame and the flexible cutter bar, the resilient biasing mechanisms selected from a group of resilient biasing mechanisms comprising: springs, hydraulic cylinders and pneumatic cylinders.

20. The flexible cutting platform of claim 14, wherein the sickle bar drive eye comprises a clamp.

* * * * *